No. 858,893. PATENTED JULY 2, 1907.
A. L. MOSS.
SANDING DEVICE FOR MOTOR VEHICLES.
APPLICATION FILED NOV. 1, 1906.
3 SHEETS—SHEET 3.
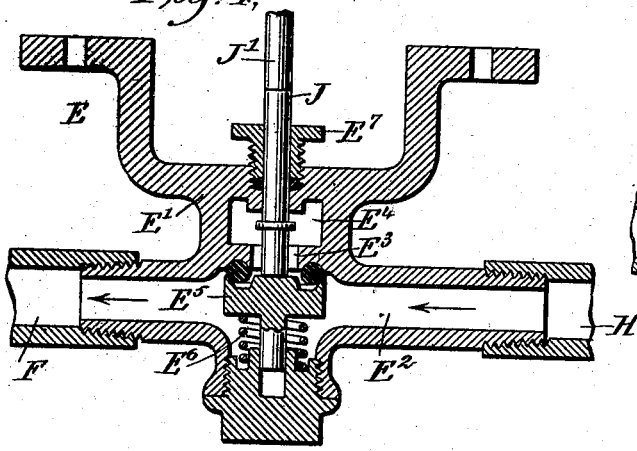
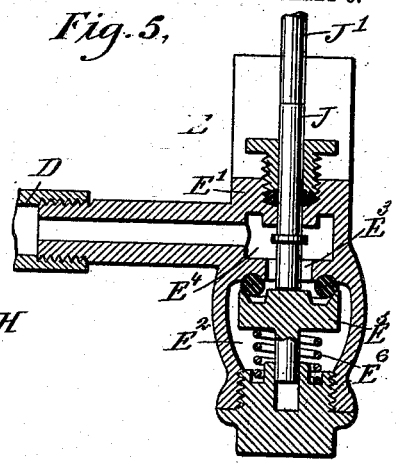
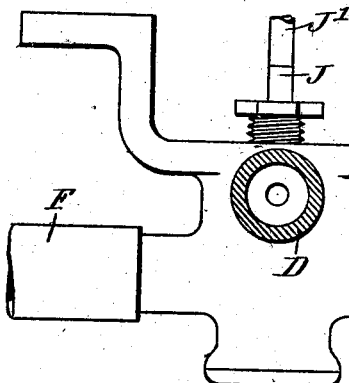
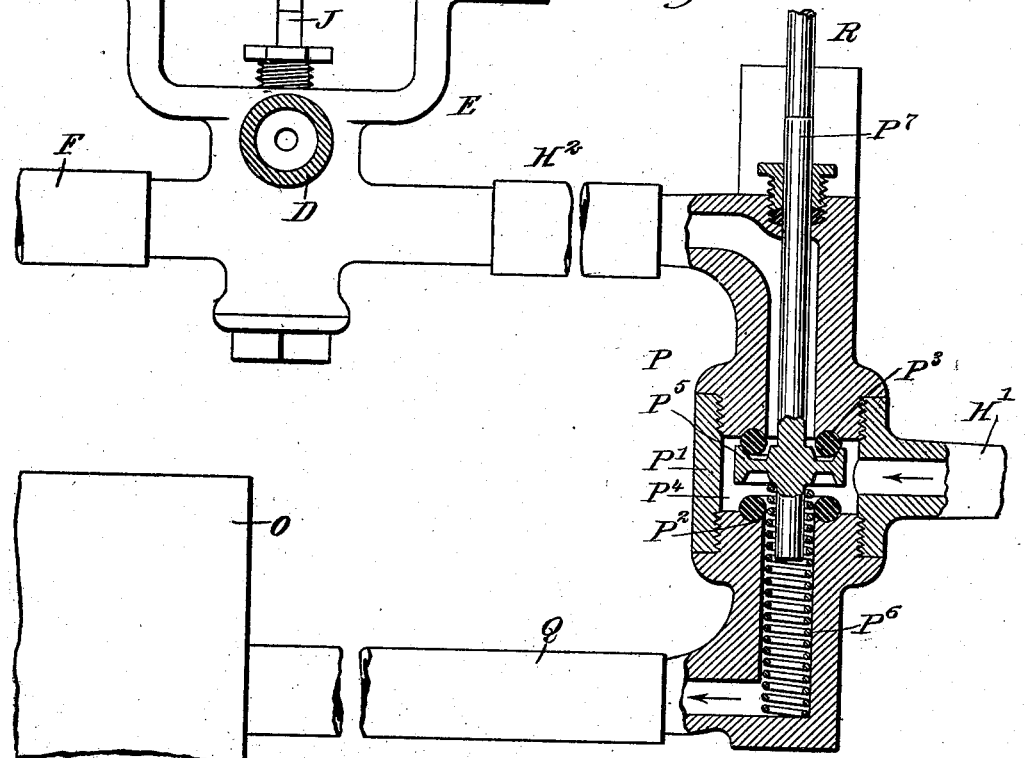
WITNESSES
Edward Thorpe
INVENTOR
Augustus Leicester Moss
BY
ATTORNEYS

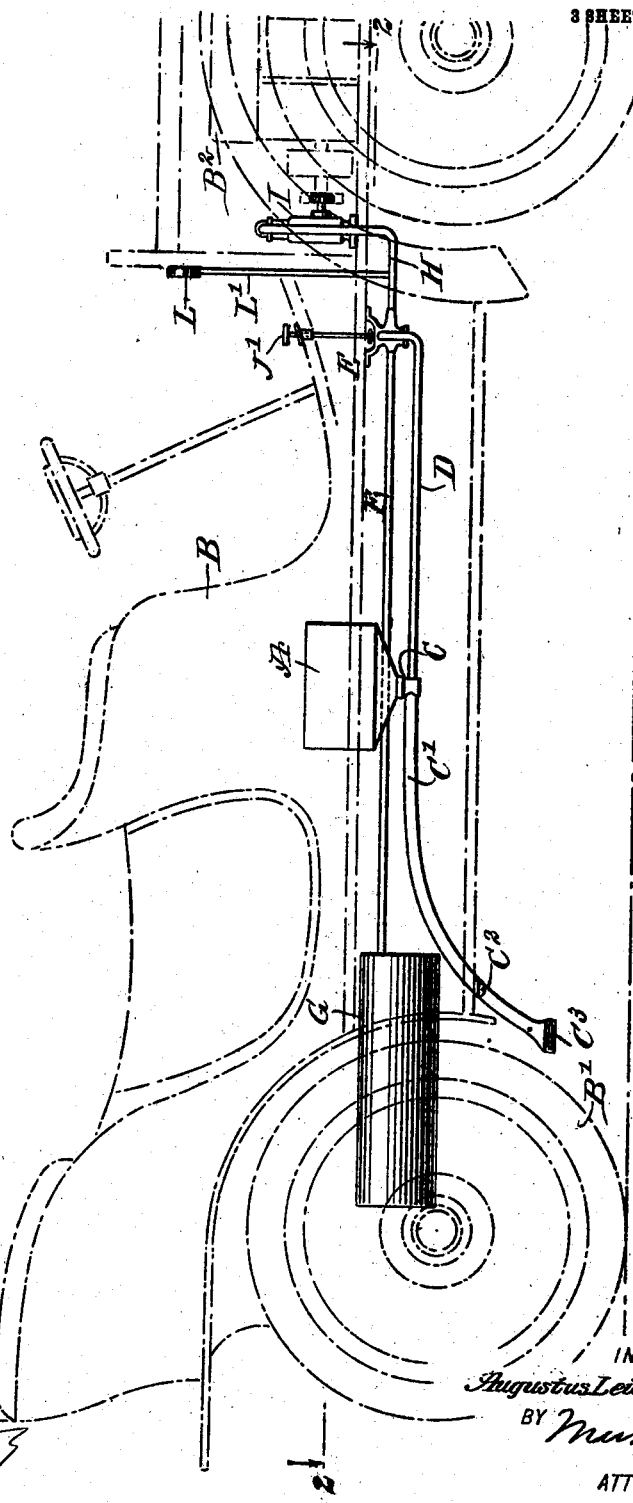

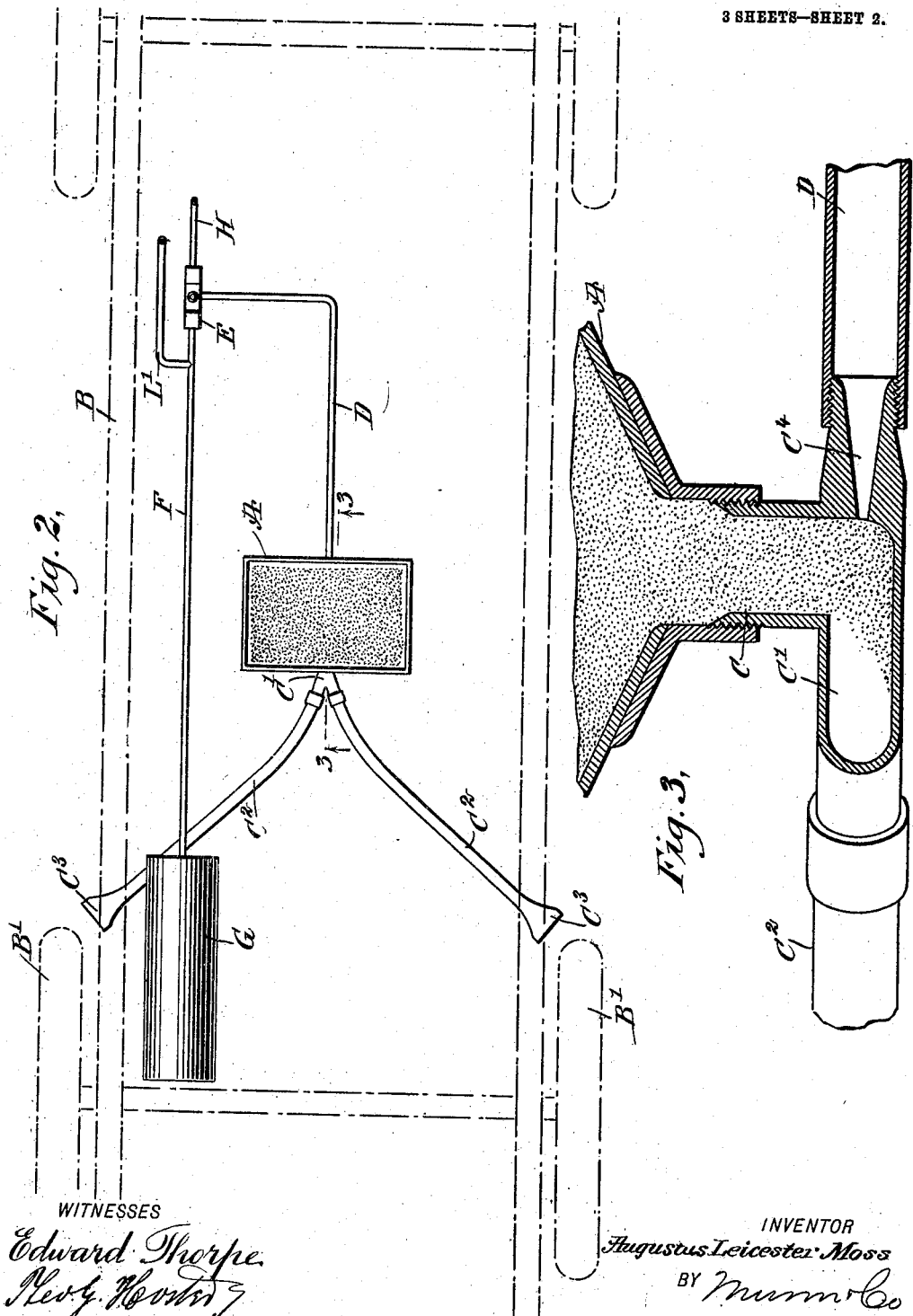

UNITED STATES PATENT OFFICE.

AUGUSTUS LEICESTER MOSS, OF SANDUSKY, OHIO.

SANDING DEVICE FOR MOTOR-VEHICLES.

No. 858,893.   Specification of Letters Patent.   Patented July 2, 1907.

Application filed November 1, 1906. Serial No. 341,558.

*To all whom it may concern:*

Be it known that I, AUGUSTUS LEICESTER MOSS, a citizen of the United States, and a resident of Sandusky, in the county of Erie and State of Ohio, have invented a new and Improved Sanding Device for Motor-Vehicles, of which the following is a full, clear, and exact description.

The invention relates to sanding devices for automobiles and like vehicles, such as shown and described in Letters Patent of the United States, No. 807,186, granted to me on December 12, 1905.

The object of the present invention is to provide a new and improved sanding device for automobiles and like motor vehicles, and arranged to scatter sand in the path to be traveled by the driving wheels of the vehicle, to prevent the latter from skidding on slippery roadways.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in all the views.

Figure 1 is a side elevation of the improvement as applied to an automobile; Fig. 2 is a plan view of the same; Fig. 3 is an enlarged sectional side elevation of the sand container and adjacent parts, the section being on the line 3—3 of Fig. 2; Fig. 4 is an enlarged sectional side elevation of the controlling valve; Fig. 5 is a transverse section of the same, and Fig. 6 is a side elevation partly in section, of a modified form of the improvement.

The sand container A is mounted in a suitable manner on the body B of the automobile or other motor vehicle, and from the hopper-shaped bottom of the said sand container A leads a sand pipe C having a horizontal member $C'$ connected with branch pipes $C^2$, $C^2$ terminating in nozzles $C^3$ for scattering the sand in the path to be traveled by the driving wheels $B'$ of the motor vehicle.

Into the horizontal member $C'$ of the sand pipe C opens axially the air blast nozzle $C^4$ (see Fig. 3), through which is adapted to pass an air blast for forcing the sand through the horizontal member $C'$, the branch pipe $C^2$ and the nozzles $C^3$ onto the roadway in front of the driving wheels $B'$. The air blast passing into the member $C'$ of the sand pipe C also draws the sand down from the container A, thus insuring at all times a supply of sand in the member $C'$, and hence a positive scattering of the sand in front of the driving wheels $B'$ takes place when the device is in use. The air blast nozzle $C^4$ is connected by a pipe D with the controlling valve E connected by a pipe F with a compressed air reservoir G, and by a pipe H with an air pump or air compressor I, of any approved construction, and preferably driven from the motor $B^2$ of the vehicle, as indicated in Fig. 1.

The controlling valve E shown in detail in Figs. 4 and 5 has its casing $E'$ provided with a passage $E^2$ connecting the pipes F and H at all times with each other, and the said passage $E^2$ is connected by a valve seat $E^3$ with a chamber $E^4$ connected with the air blast pipe D. A valve $E^5$ arranged within the passage $E^2$ is normally held to the seat $E^3$ by a spring $E^6$, and the top of the said valve $E^5$ is engaged by a stem J extending through a stuffing box $E^7$ to the outside of the casing $E'$, and the said stem J is engaged by a pedal $J'$ mounted to slide on the vehicle body B and under the control of the foot of the operator. A pipe $L'$ leads from the pipe F to a gage L, to indicate the pressure of the air contained in the reservoir G.

The operation is as follows: When the air compressor I is driven from the motor of the vehicle then air is pumped through the pipe H, the passage $E^2$ and the pipe F into the reservoir G, to charge the same to a desired pressure indicated by the gage L, and when the desired pressure is reached the air compressor I is thrown out of gear with the motor $B^2$ of the vehicle. Now when it is desired to scatter sand in front of the driving wheels $B'$ it is only necessary for the operator to press the pedal $J'$, so that the valve $E^5$ is opened and the compressed air can now pass from the passage $E^2$ by the valve seat $E^3$ into the chamber $E^4$, and from the latter by way of the pipe D into the air blast nozzle $C^4$, to force the sand in the member $C'$ of the sand pipe C through the branch pipes $C^2$ and nozzle $C^3$ onto the roadway in front of the driving wheels $E'$ to prevent the same from skidding. As soon as the operator releases the pressure on the pedal $J'$, the valve $E^5$ immediately closes by the action of its spring $E^6$. It is understood that the valve $E^5$ may be opened at any time, that is, even when the motor I is running as the air pressure then can pass directly from the motor by way of the pipe H, the passage $E^2$, seat $E^3$, chamber $E^4$ and pipe D to the air blast nozzle $C^4$, to force the sand onto the roadway, as previously explained. In case the automobile or other motor vehicle is already provided with an air reservoir O for other purposes, then use is made of a valve P, shown in Fig. 6, to allow the use of the air pump or air compressor I for supplying air pressure to both reservoirs G and O. The valve P is provided with a valve casing $P'$ connected by a pipe $H'$ with the pump I by a pipe $H^2$ with the passage $E^2$ of the valve E and by a pipe Q with the second reservoir O. In the casing $P'$ are arranged two valve seats $P^2$, $P^3$, of which the valve seat $P^2$ leads to the pipe Q and the other valve seat $P^3$ leads to the pipe $H^2$, both valve seats opening into a central chamber $P^4$ connected with the pipe $H'$, and containing a valve $P^5$ normally held to the seat $E^3$ by a spring $P^6$. The stem $P^7$ of the valve P⁵ is engaged at its outer end by a second pedal R under the control of the foot of the operator. Now when the valve P⁵ is in a closed position, as shown in Fig. 6, then the reservoir G is cut off from the pump I for the latter is connected with the reservoir O to supply the same with compressed air. When it is desired to charge the reservoir G it is only necessary for the operator to press the pedal R so that the valve P⁵ is moved off its seat and onto the seat P², so as to temporarily disconnect the pump I from the reservoir O. Compressed air from the pump I can now pass by way of the valves P and E to the reservoir G so as to charge the same, and the valve E interposed between the valve P and the reservoir G can be operated at any time for furnishing an air blast to force the sand from the container A through the nozzle C³ onto the roadway, as previously explained. As soon as the operator releases the pressure on the pedal R, the valve P⁵ closes by the action of its spring P⁶, to bring the valve P back to a normal position.

The sanding device shown and described is composed of comparatively few parts, not liable to easily get out of order, and only a simple movement on the part of the operator is required to actuate the sanding device so as to cause a scattering of sand in front of the wheels B′, to prevent the automobile or like vehicle from skidding.

Having thus described my invention, I claim as new and desire to secure by Letters Patent:—

1. An automobile and like vehicle provided with a sanding device comprising a sand container, a sand delivery pipe leading from the sand container and having nozzles for scattering the sand in the path to be traveled by the driving wheels of the vehicle, an air reservoir, an air pump having a connection with the said reservoir for charging the latter with compressed air, a manually controlled valve in the said connection and connected with the said sand delivery pipe, the valve being normally closed to disconnect the said connection from the sand delivery pipe, the valve when opened allowing compressed air to pass from the connection to the said sand delivery pipe, a second air reservoir connected with the air pump, and a second manually controlled valve in the said connections to connect either air reservoir with the pump.

2. An automobile and like vehicle provided with a sanding device comprising a sand container, a sand delivery pipe leading from the sand container and having nozzles for scattering the sand in the path to be traveled by the driving wheels of the vehicle, an air reservoir, an air pump having a connection with the said reservoir for charging the latter with compressed air, a manually controlled valve in the said connection and connected with the said sand delivery pipe, the valve being normally closed to disconnect the said connection from the sand delivery pipe, the valve when opening allowing compressed air to pass from the connection to the said sand delivery pipe, a second air reservoir connected with the air pump, and a second manually controlled valve in the said connections to connect either air reservoir with the pump, the said second valve being normally closed to the first named reservoir and located between the pump and the first named valve.

3. An automobile and like vehicle provided with a sanding device comprising a sand container, a sand delivery pipe leading from the sand container and having nozzles for scattering the sand in the path to be traveled by the driving wheels of the vehicle, an air reservoir, an air pump having a connection with the said reservoir for charging the latter with compressed air, a manually controlled valve in the said connection and connected with the sand delivery pipe, the valve being normally closed to disconnect the said connection from the sand delivery pipe, the valve when opened allowing compressed air to pass from the connection to the said sand delivery pipe, a second air reservoir connected with the air pump, a second manually controlled valve in the said connections to connect either air reservoir with the pump, the said second valve being normally closed to the first-named reservoir and located between the pump and the first-named valve, and a spring for holding the said second-named valve in a normally closed position.

4. A sanding device for automobiles and like vehicles comprising a vertical sand container, a sand pipe leading from the said sand container and having a horizontal portion provided with sand distributing nozzles for scattering sand in the path to be traveled by the driving wheels of the vehicle, an air blast nozzle opening into the said sand pipe and axially with respect to the horizontal portion, and a compressed air controlling valve connected with a source of compressed air and connected with the said air blast nozzle.

5. A sanding device for automobiles and like vehicles provided with an air controlling valve comprising a valve casing having a passage for connecting an air pump with a compressed air reservoir, the said valve casing having a chamber connected with the sand distributer, and by a valve seat with the said passage, and a spring pressed valve normally seated on the said seat, and manually controlled means for opening the said valve to connect the said passage with the said chamber.

6. A sanding device for automobiles and like vehicles provided with an air-controlling valve comprising a valve casing having a passage for connecting an air pump with a compressed air reservoir, the said valve casing having a chamber connected with the sand distributer and by a valve seat with the said passage, and a spring pressed valve normally seated on the said seat, and a pedal device on the said casing for opening the said valve.

7. A sanding device for automobiles and like vehicles comprising a sand container, a sand pipe leading from the said sand container and provided with distributing nozzles, compressed air reservoirs, a pump for charging the said reservoirs with compressed air, and manually controlled valves, one for controlling the compressed air from the air pump to either of the said reservoirs, and the other for controlling a blast of air from one of the reservoirs to the said sand pipe.

In testimony whereof I have signed my name to this specification in the presence of two subscribing witnesses.

AUGUSTUS LEICESTER MOSS.

Witnesses:
THEO. G. HOSTER,
EVERARD B. MARSHALL.